[11] 3,610,723

[72] Inventor Erich Spitz
 Paris, France
[21] Appl. No. 807,377
[22] Filed Mar. 14, 1969
[45] Patented Oct. 5, 1971
[73] Assignee Thomson-CSF
[32] Priority Mar. 20, 1968
[33] France
[31] 144,508

[54] HOLOGRAPHIC SYSTEM FOR STORING INFORMATION LYING IN A PLANE
 8 Claims, 7 Drawing Figs.
[52] U.S. Cl.................................................. 350/3.5, 350/DIG. 1
[51] Int. Cl............................................... G02b 27/22
[50] Field of Search........................................ 350/3.5, DIG. 1

[56] References Cited
UNITED STATES PATENTS
3,083,615 4/1963 El-Sum.................... 350/3.5 UX
3,408,656 10/1968 Lamberts.................. 350/162 UX OTHER REFERENCES
Rosen, Proceedings of the IEEE, pp. 70–81 (1/1967)

Primary Examiner—David Schonberg
Assistant Examiner—Robert L. Sherman
Attorney—Cushman, Darby & Cushman ABSTRACT: The invention relates to systems for optically storing and retrieving information. The information is stored on a photographic support by means of two interfering beams of monochromatic light supplied from a common luminous source. One of said beams is optically modulated and a lens system is interposed on its path for focusing at least one bundle of rays in a plane lying above the substrate.

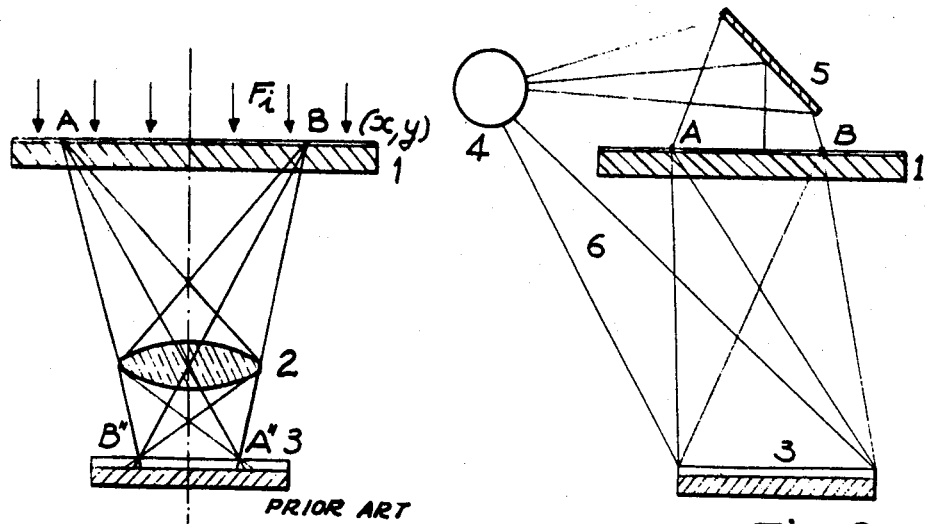
Fig.1 PRIOR ART
Fig.2 PRIOR ART
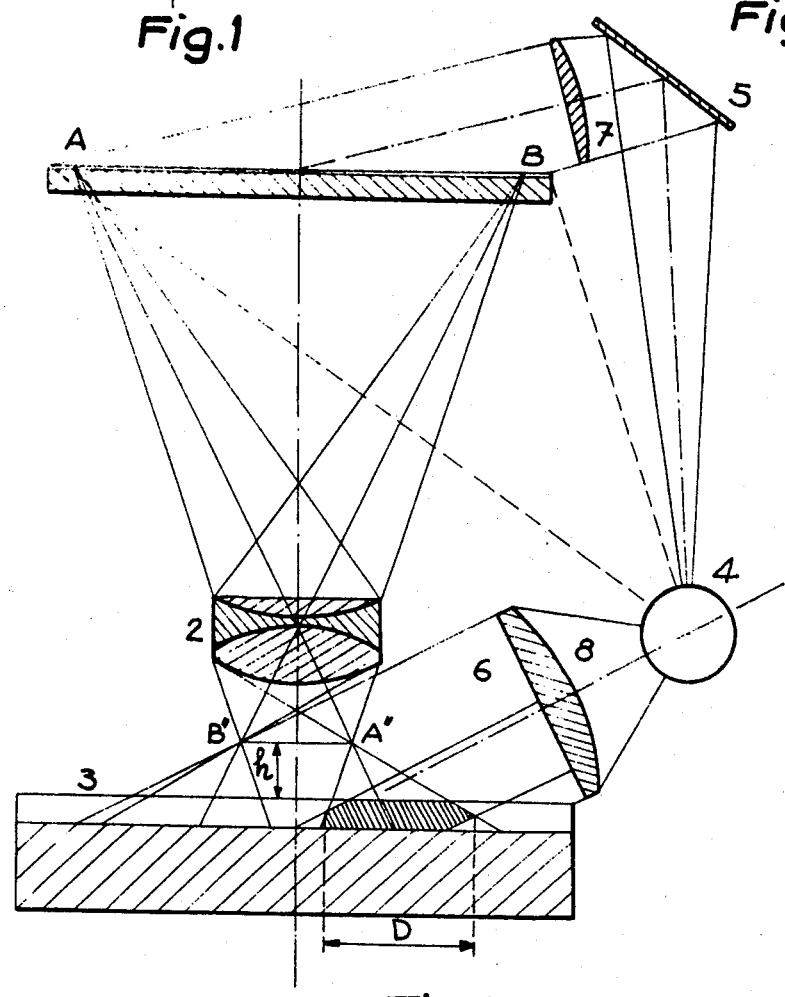
Fig.3

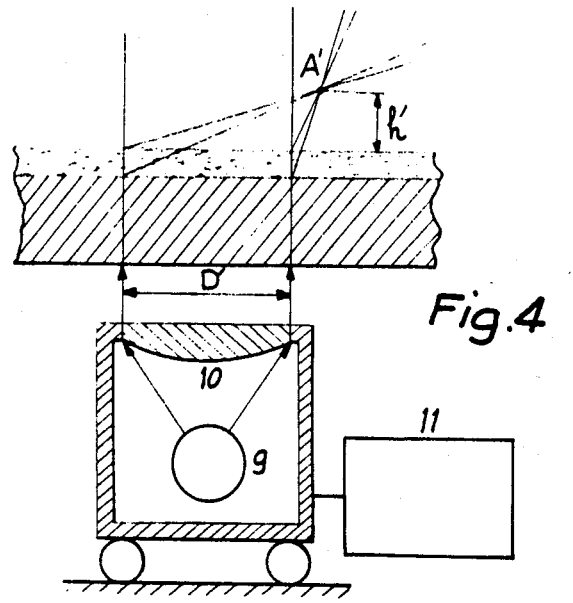
Fig.4
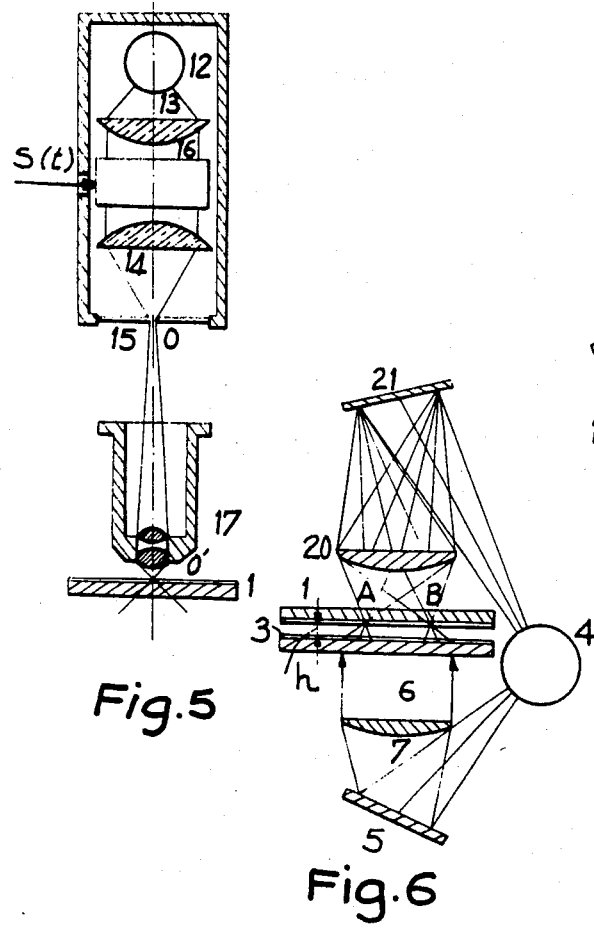
Fig.5
Fig.6
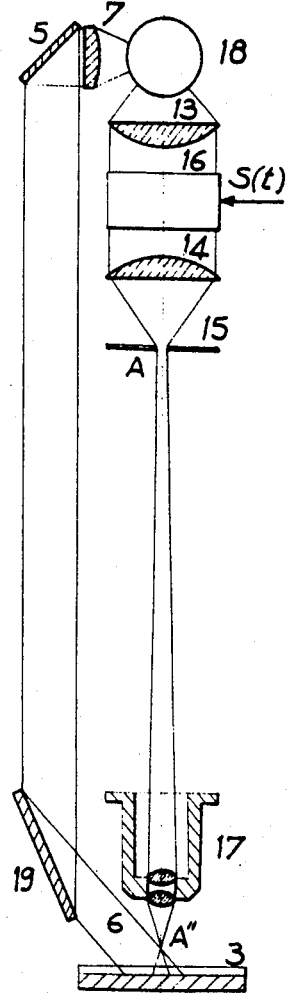
Fig.7

HOLOGRAPHIC SYSTEM FOR STORING INFORMATION LYING IN A PLANE

The present invention relates optical systems designed to store a large quantity of information on a photographic substrate of limited volume. The information to be recorded may be in the form of images, that is to say patterns of luminous spots, the brightness $z$ of which is a function of two variables $x$ and $y$; it may also be a function of time, where the variables $x$ and $y$ are themselves functions of time.

At the present time, two methods exist for the recording of images; the best known system is photography or microphotography which consists in reducing the size of images by means of an optical device employing lenses; the other method is based upon the production of a hologram of the images which are to be recorded.

The hologram has advantages over microphotography, since the whole of the emulsion over the whole of its area and throughout its thickness participates in the recording of each element of the image. The whole of the information contained in the hologram is available, even if the support has suffered alteration, due, for example, to scratches or dust. This is not the case of photography since the impressed film is very thin and the recorded image is distributed over the recording surface, so that each detail is exactly localized. However, photography presents the advantage of short duration of exposure, since the light energy is concentrated by large-aperture lenses. Further the localization of the information is an advantage where it is desired to effect partial readout since it means that only the relevant zone has to be illuminated.

According to the invention there is provided an optical system for storing information on a photographic substrate comprising a source of monochromatic light supplying first and second beams, following different paths and incident on a common portion of said substrate; optical-modulating means positioned on the path of said first beam; and stigmatic optical means positioned on said last mentioned path for focusing at least one bundle of rays contained within said first beam on an image surface located above said substrate.

For a better understanding of the invention and to show how the same may be carried into effect, reference will be made to the drawing accompanying the ensuing description and in which:

FIG. 1 illustrates a known microphotographic-recording system;

FIG. 2 illustrates a known system for producing a hologram;

FIG. 3 is a first embodiment of the recording system in accordance with the invention;

FIGS. 4, 5 and 6 are explanatory diagrams; and

FIG. 7 is a second embodiment of the recording system in accordance with the invention.

In FIG. 1, a known arrangement for effecting the microphotographing of optical signals, presented as a transparency or slide, is illustrated. The optical signals are recorded on a variable-transparency substrate which is illuminated by a light source in order to produce by transparency or reflection, an image, each point of which, having the coordinates $x$ and $y$, has a brightness $z=f(x, y)$. The system illustrated in FIG. 1 thus comprises a substrate 1, on which optical signals are recorded and which is illuminated by an incident light beam $F_i$, and a stigmatic optical system 2, the object plane of which is the plane $(x, y)$ of the substrate 1 and the image plane of which is a light-sensitive layer or film 3. The points A and B on the substrate 1 have corresponding image points A″ and B″, located upon the upper face of the layer 3. Below the points A″ and B″, the light is confined within a cone the base of which is the wider, the larger the apertural angle of the system 2 and the thicker the layer 3.

In order to achieve a high-information density in the layer 3, a wide-aperture lens is needed in order to cut down the diameter of the diffraction spot. It is also necessary to use an extremely thin film. It will be seen that this system presents the advantage of concentrating the light but is highly susceptible to scratching and dust, factors which can mean that certain portions of the recording are rendered incapable of being read out.

The recording system illustrated in FIG. 2 is based upon the interference occuring between two light beams emitted by a coherent light source 4. As in the earlier case, the system embodies a substrate 1 on which optical signals are recorded; this substrate is illuminated through the medium of a mirror 5 so that the points A and B on it may diffuse, in the direction of the sensitive layer 3, spherical light waves which, do not encounter any stigmatic optical system on their trajectory. As those skilled in the art will be aware, these waves interfere with a reference beam 6 to produce at the surface or within the layer 3, a two or three-dimensional network of fringes which, after developing, constitute a hologram of the substrate 1. By illuminating the hologram with a readout beam of the same type as the beam 6 it is possible, as is well known, to observe in space, a virtual or real image of the recorded object 1. The image readout by this method is complete even if only part of the hologram is used; it is only the sharpness of the image which is then affected, since the reconstitution of the image is based upon a reduced diffracting aperture. Since this method makes use of thick sensitized layers, it might be considered that it overcomes the drawbacks of microphotography. However, it does not have the advantage of concentrating the light.

In order to combine the advantages of these known systems without at the same time introducing their specific drawbacks, the present invention, as shown in the diagram of FIG. 3, proposes the formation, by means of a stigmatic optical system 2, of an image A″ B″ of optical signals recorded on a substrate 1 for optical signals. This image A″ B″ floats so to speak above the sensitized layer 3 at a height $h$ therefrom, so that the said layer or film 3 is systematically subjected to the divergent light issuing from each point of the image A″ B″. Thus, unlike the system of FIG. 1, a sharp image is formed in space and a very blurred image upon the sensitized layer or film 3. This arrangement makes it possible to illuminate from the point A of the substrate 1, an area of the layer 3, the dimension D of which is substantially larger than that obtained in the case of FIG. 1, although smaller than that obtained in the case of FIG. 2. The system of FIG. 3 employs a coherent light source 4, which illuminates the substrate 1 through the medium of the mirror 5 and a lens 7; this source also furnishes a reference beam 6 which is focused by a lens 8.

Under the combined effect of the conical light bundle coming from the point A and of the reference beam 6, a two-dimensional or three-dimensional network of interference fringes is formed in the crosshatched portion of the layer 3. After developing, this portion constitutes a hologram of the point A″ and, since the image A″ B″ contains a very large number of such points, the corresponding holograms are superimposed and overlap one another so as to cover all the illuminated area of the film 3.

In order to read out the hologram produced by the device shown in FIG. 3, the invention provides the arrangement schematically shown in FIG. 4. This arrangement incorporates a coherent light source 9 producing a readout beam, the breadth D′ of which is equal to or greater than D. This beam is focused by a lens 10 in the direction of the layer 3 containing the holograms of the image A″ B″. Under the action of the readout beam the network of interference fringes recorded in the film 3, reconstitutes a real image A′ of the point A″ of the image A″ B″; this real image floats above the layer 3, at a height $h'$ therefrom, and can be observed by means of an eyepiece or microscope. By displacing the readout device by means of a mechanism 11, it is possible to select the particular portion of the layer 3 which corresponds to the portion of the image one wishes to observe; the sharpness of the image readout in this way depends upon the cross section of the readout beam and is only diffraction limited.

By way of a nonlimitative example, the extent D of the zone of the hologram involved in the reproduction of an image point, will be somewhere between 100 microns and some few millimeters, this in order to obtain adequate sharpness of reproduction a high degree of insensitivity to any superficial alternation of the layer 3.

It goes without saying that the more sensitive the layer 3 and the wider the apertural angle of the viewing lens, the greater can the extend D be made.

On the other hand, it can be seen from FIG. 3 that the substrate 1 can modulate the light equally well by transmission or reflection; in the latter case the source 4 illuminates the substrate 1 by the beam shown in broken line.

FIG. 5 shows an auxiliary device which enables to record on a substrate 1 optical signals corresponding to the formation available in the form of an electrical signal $S(t)$. The substrate 1 has a variable transparency $z(x, y)$ which, when $X$ and $y$ are predetermined functions of time can be written in the form $z(t) = S(t)$. The device of FIG. 5 comprises a light source 12, associated with two lenses 13 and 14 and a diaphragm 15, in order to produce a light spot 0. The brightness of the spot 0 is modulated by the signal $S(t)$ by means of an electrooptical modulator 16 which intercepts the beam coming from the source 12; the image 0' of the spot 0 is formed upon the light-sensitive layer of the substrate 1 by means of an objective 17. By displacing the substrate 1 in relation to the image 0' in two directions $x$ and $y$ within its plane, an image representative of the signal $S(t)$ is formed. This image can be produced on a scale such that there is no difficulty at all in recording the most minute details of the signal $S(t)$.

When the substrate 1 has been exposed and developed, it is placed in the device shown in FIG. 3 where it is used to prepare as many films 3 as required.

When the substrate 1 has been exposed to optical signals on the scale at which they are to be recorded on the film 3, the lens can be dispensed with and reproduction can be carried out in accordance with the diagram of FIG. 6. In FIG. 6, the substrate 1 and the film 3 are placed face-to-face with an interval $h$; the source 4 illuminates the substrate 1 through the medium of the optical devices 20 and 21; through the medium of the mirror 5 and the lens 7, it furnishes a reference beam 6. The interference between the coherent light of the beam 6 and the light coming from the points A and B of the substrate 1, creates in the film 3 a network of fringes which enable the reconstitution in full size of the optical signals stored in the substrate 1, to be obtained.

The invention likewise provides for the recording, in a single operation, of a signal $S(t)$. In FIG. 7, a device of this kind can be seen which comprises a coherent light source 18 associated with lenses 13 and 14 and a diaphragm 15 in order to produce a light spot A located in the object plane of a lens 17. The brightness of the spot A is modulated by signal $S(t)$ by means of an electro-optical modulator 16; the image A'' of the spot A is formed above the layer 3 so that the latter is illuminated by a light cone the apex of which is at A''. A reference beam 6, transmitted by the lens 7 and mirrors 9 and 19, meets the light cone coming from A'' and thus gives rise to the production in the layer 3 of a pattern of interference fringes. The layer 3 is displaced in its own plane in the directions $x$ and $y$ so that the instantaneous values of the brightness of the spot A'' form a pattern of light amplitudes on the film 3. After developing and applying a readout beam to it, the layer 3 reconstitutes in space a light trace, the variable brightness of which can be detected by a spot-type photoelectric detector of controlled position.

Finally, it is necessary to point out that the recording in two operations, using the devices of FIGS. 3 and 6, have the advantage of producing the hologram as a whole with fringes which are better distinguished from the average darkening of the film 3, since there is only a single exposure. Finally, the devices of FIGS. 3, 6 and 7 are characterized by the fact that they do not require any critical focusing, they give excellent reproduction despite inevitable variations in the distance between lens and film 3 or substrate 1.

Of course the invention is not limited to the embodiments described and shown which were given solely by way of example.

What is claimed is:

1. An optical system for storing information on a photographic substrate comprising a source of monochromatic light supplying first and second beams following different paths and incident on a common portion of said substrate; optical-modulating means positioned on the path of said first beam; and stigmatic optical means positioned on said last mentioned path for focusing at least one bundle of rays contained within said first beam on a plane image surface located at a predetermined height above said substrate.

2. An optical system as claimed in claim 1, wherein said modulating means comprise a transparency carrying said information; said stigmatic means having an object plane along which said transparency is positioned.

3. An optical system as claimed in claim 1, wherein said stigmatic means comprise a lens.

4. An optical system as claimed in claim 1, wherein said modulating means comprise a transparency carrying said information and positioned along said image surface.

5. An optical system as claimed in claim 1, wherein said modulating means comprise an electro-optical modulator having a control input for receiving an electrical signal and an aperture supplying a modulated bundle of rays; said system further comprising translation means for displacing said substrate with respect to at least one of said other mentioned means.

6. An optical system as claimed in claim 1 further comprising an information retrieval system for the retrieval of information stored within said substrate, said information retrieval system comprising a source of monochromatic light supplying onto said substrate a beam having the optical characteristics of said second beam and means for displacing said beam with respect to said substrate.

7. An optical system as claimed in claim 2, wherein said transparency carries an optical pattern whose transmission coefficient variations along its length are representative of the amplitude variations of an electrical signal.

8. An optical system as claimed in claim 4, wherein said transparency carries an optical pattern whose transmission coefficient variations along its length are representative of the amplitude variations of an electrical signal.